US006103128A

United States Patent [19]

Koso et al.

[11] Patent Number: 6,103,128

[45] Date of Patent: Aug. 15, 2000

[54] METHOD AND APPARATUS FOR MIXING GAS WITH LIQUID

[75] Inventors: Arto Koso, Karhula; Heikki Manninen, Mänttä, both of Finland

[73] Assignee: Sulzer Pumpen AG, Winterthur, Switzerland

[21] Appl. No.: 09/297,174

[22] PCT Filed: Oct. 27, 1997

[86] PCT No.: PCT/FI97/00652

§ 371 Date: Apr. 27, 1999

§ 102(e) Date: Apr. 27, 1999

[87] PCT Pub. No.: WO98/18544

PCT Pub. Date: May 7, 1998

[30] Foreign Application Priority Data

Oct. 31, 1996 [FI] Finland .................................... 964389

[51] Int. Cl.[7] ................................ B01F 3/04; B01F 5/12; C02F 1/24; B03D 1/14; D21C 5/02

[52] U.S. Cl. .......................... 210/703; 210/219; 210/220; 210/221.2; 261/28; 261/93; 96/216; 96/217; 162/4; 209/164; 209/170; 95/261

[58] Field of Search ................................ 210/703, 221.2, 210/221.1, 219, 220; 261/28, 93; 96/216, 217; 162/4; 209/170, 164; 95/261

[56] References Cited

U.S. PATENT DOCUMENTS 5,240,621 8/1993 Elonen et al. .

FOREIGN PATENT DOCUMENTS

| | | |
|---|---|---|
| 0 362 431 | 10/1988 | European Pat. Off. . |
| 0 478 228 B1 | 9/1991 | European Pat. Off. . |
| 86381 | 5/1992 | Finland . |
| 453 464 | 2/1988 | Sweden . |
| 566 165 | 9/1995 | Switzerland . |
| WO 87/02907 | 5/1987 | WIPO . |

*Primary Examiner*—Thomas M. Lithgow

*Attorney, Agent, or Firm*—Nixon & Vanderhye P.C.

[57] ABSTRACT

A mixing device in the form of a centrifugal pump is used to mix gas (typically air) with liquid (typically effluent water, dispersion water, or waste paper pulp suspension, etc.). The pump is provided with a common inlet conduit for both the liquid and the gas so that liquid and gas flow freely and in an arbitrary ratio into the pump, that is there is no controlling or adjusting of the flows. The gas is allowed to either dissolve in the liquid or be mixed as small bubbles with the liquid, and any surplus gas is separated from the mixing device (e.g. by holes in the pump impeller leading to a rear portion of the pump which is attached to a vacuum source, such as a liquid ring pump). The liquid and gas dissolved therein, and small bubbles mixed therein, are discharged from the mixing device at a pressure that is raised from the inlet pressure, due to the action of the impeller, which pressure development enhances the dissolution of gas in the liquid. Treatment chemicals, such as flotation-enhancing chemicals, can be added to the liquid before it enters the centrifugal pump, and the outlet from the pump may be connected to a flotation tank or the like.

20 Claims, 1 Drawing Sheet

METHOD AND APPARATUS FOR MIXING GAS WITH LIQUID

CROSS-REFERENCE TO RELATED APPLICATION

This is a U.S. national phase of International Application No. PCT/FI97/00652 filed Oct. 27, 1997.

BACKGROUND AND SUMMARY OF THE INVENTION

The present invention relates to a method and apparatus for adding a treating agent/treating agents to a liquid. More particularly, it relates to a method and apparatus for mixing gas, usually air, with a liquid, e.g, effluent, and dissolving the gas in the liquid.

Many different methods and apparatus are known which are used for this purpose. However, reference is here made to one prior art apparatus only. It is disclosed in Finnish patent 86381. Reference is here also made to a theory disclosed in that patent publication, for dissolving gas in a liquid. It is taught, among other things, in the publication that the solubility of a gas in water is directly proportional to the pressure of the gas and inversely proportional to the temperature, with certain coefficients. Thus, it can be established that, by raising e.g. the pressure of the liquid several atmospheres, the volume of dissolving gas may be correspondingly increased, in comparison with normal atmospheric pressure conditions. An increase in the temperature lowers the solubility to correspond 0° C. (Kelvin temperature +273° K), which is correspondingly revised with the prevailing temperature ratio, i.e., if the conditions are +20° C., the solubility has lowered from the 0-degree condition by a ratio 273/293, i.e., to a 0.9317406-fold value. Each gas has a coefficient of its own, readable from technical tables, which coefficient also influences the solubility value. Solubility may be given in volume units of gas per volume unit of liquid ($Ncm^3/cm^3$) or in volume units of gas per weight unit of liquid ($Ncm^3/g$).

In practice, the most usual uses are related to, e.g., dissolving of air in water, for example in connection with effluent treatment or in aerating lake and pond waters. An essential role is played here by the oxygen of air, about 20% of the air being oxygen. Oxygen provides, e.g., living conditions of fish in water, and the oxygen content of water should be at least 4 to 5 mg/l. Usually the oxygen content is and it should be over 6 mg/l. Oxygen is consumed by organic compounds which have ended up in water and which oxydate and decompose, causing water-courses to overgrow and become eutrophic. To prevent such a course of events, effluents are normally handled in water purification plants where solids are removed as completely as possible and, finally, organic residuals are oxydated, i.e., treated biologically. This procedure often requires plenty of oxygen to be dissolved in water.

Many different methods exist, which may be used for this purpose. The most usual method is to use pressurized air produced by a compressor and to blow it to the bottom part of a waste water basin, through shattering nozzles arranged in connection with the bottom. The smaller the bubbles are, the faster the solubility of air. Therefore, production of extremely small air bubbles with the shattering nozzles is aimed at. This requires extra pressure in air blowing. This pressure is in principle wasted for breaking up the air in water, since the solubility is only influenced by how deep down below the liquid level the shattering nozzles are disposed. The method is therefore not economical, even though it is widely used as it is technically easy to realize. Besides being uneconomical, it also has a further drawback, i.e., nozzles becoming clogged by impurities in compressed air.

Another way of mixing oxygen with water is to use various, large mixers. In these devices, water is lifted to fly in large quantities, in the form of drops, in the air, whereby the airdraft being simultaneously formed comes into contact with the drops. As a result, oxygen dissolves in the treated water. This method is used, for example, for treating effluents in the wood processing industry. However, in spite of large quantities of treated liquid, it cannot be considered an efficient method in terms of energy economy.

One way is to use a swiftly rotatable rotor within the liquid and supply pressurized air to the rotor, either by using self-admission or some other way. The rotor then mixes this air with the liquid, shattering the air efficiently. Both high and low efficiencies have been reported.

The equipment disclosed in the Finnish patent 86381 is based on a pump where the gas to be dissolved is mixed with liquid in such a manner that the suction opening of the pump is provided with a separate inlet conduit for gas, whereby the suction effect produced by the impeller draws the required volume of gas to the impeller and further into the pump housing. A pressurized outlet pipe of the pump is provided with a pressure mixer unit where liquid and gas are then thoroughly mixed with each other when they are flowing under pressure through the mixer unit to a separator of excess gas.

In this prior art arrangement, liquid flows through a valve and under control thereof, to a suction conduit of the pump. It is typical of an arrangement like this that a conventional centrifugal pump cannot pump such liquid the suction side flow whereof has been controlled in a manner described above. The suction conduit leads the flow to the impeller which is in the pump housing. The suction conduit 5 is provided with a pipe, for leading the gas flowing therethrough directly to the impeller. The gas flow is in this case best controlled with a control valve. On the pressure side of the pump, connected to the outlet thereof, there is arranged a pressure mixer unit, and after that a control valve. The outlet flow from the control valve is so controllable that the required pressure is obtained in the mixer. It is also possible to include a pressure gauge control which is known per se, in this arrangement.

When the inlet flow to the impeller is suitable or throttled to a required extent, the gas flow will be absorbed by the liquid and entrained therewith to the impeller. As soon as the gas volume is suitable and the pressure side has been adjusted, either by the load of the piping or by the valve, the flow will be made up of liquid saturated with gas. If and when the pressure of this flow is reduced, for example, to a free atmospheric pressure, the excess gas will be separated from the liquid as molecular bubbles which are ready to adhere to solids, oil, greases, flocs, dregs, or corresponding particles which together rise to the surface. This phenomenon, i.e, gas release may be utilized in many different applications, for example, flotation.

As air contains four times more nitrogen than oxygen in proportion and as the solubility of nitrogen in water is approximately half of the solubility of oxygen, a big portion (about 70%) of the nitrogen will remain in the liquid in a gaseous form. Depending on circumstances, this portion may either be left in the liquid as bubbles or removed by a separate gas separator. The gas separator arrangement may be known per se, but it is essential to this prior art arrangement to use a controllable valve, for selecting the pressure range in which the gas accumulated in the upper part of the gas separator is released. This pressure range is lower than the counter-pressure in the pump which is generated by the valve or the piping arranged thereafter.

The equipment described above seems, however, unnecessarily complicated for such a simple task as mixing of air with a liquid. In the first place, the equipment described needs a valve on the suction side of the pump, for regulating the flow of liquid entering the pump. Correspondingly, a separate suction conduit with a control valve is needed for the gas to be mixed. However, the pressure mixer unit with a control valve and gas separator, arranged on the pressure side of the pump is the most complicated means of this prior art equipment. A conventional centrifugal pump is out of the question in this case because it is incapable of pumping gaseous liquid.

The basis of the present invention is to simplify the structure of both the gas mixing device and other equipment possibly arranged in connection therewith, and to use a centrifugal pump if possible.

As for other equipment arranged in connection with the gas mixing device, it is to be noted that the equipment in accordance with the above identified Finnish patent is suggested for use in aerating/oxydating of lakes and ponds and also for use in aerating/oxydating of effluents of the wood processing industry. It is also worth while noticing that it is necessary, when the equipment in accordance with said patent publication is used, to have been made sure that an even flow of liquid enters the inlet side of the pump. In other words, the suction side of the pump has to be provided with a specific buffer tank, separately built if necessary, for ensuring a sufficient flow of liquid.

The present invention provides a simple mixing device, and neither the inlet nor the pressure side thereof calls for any special equipment, but it may be arranged directly in the process. The equipment disclosed in the above-identified patent, for example, requires a separate mixer to be arranged after the pump, just like the other gas mixing devices which are known to us.

The characteristic features of the method and apparatus in accordance with the present invention will become apparent from the accompanying claims.

BRIEF DESCRIPTION OF THE DRAWING

The method and apparatus in accordance with the invention will be described more in detail in the following, with reference to the accompanying drawing, in which.

DETAILED DESCRIPTION OF THE DRAWING

Figure 1:
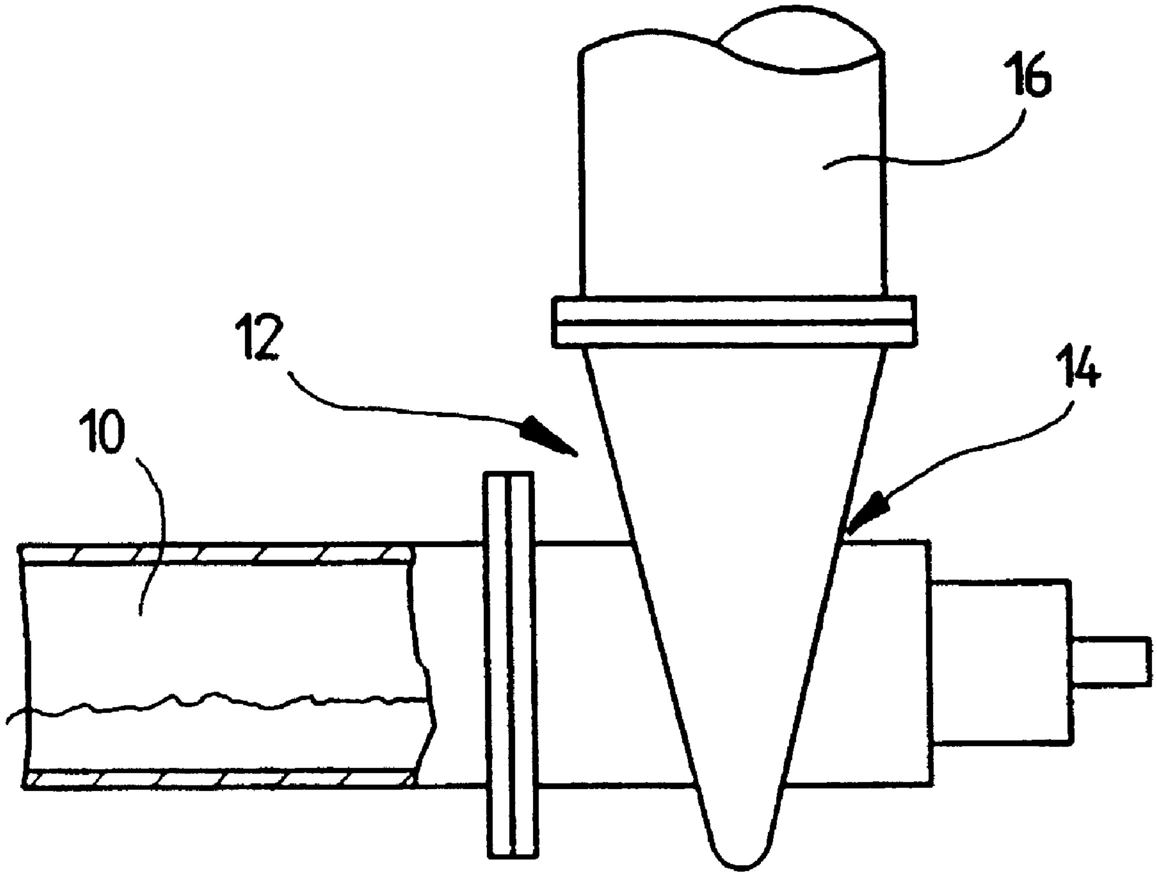
FIG. 1 is a schematic illustration of an apparatus according to a preferred embodiment of the invention.

In accordance with FIG. 1, the apparatus according to the present invention mainly comprises a mixing device 12, an inlet pipe 10, an outlet means 14 for separated gas, and a pressure pipe 16. The apparatus described above functions so that liquid and gas flow freely via the inlet pipe 10 to the mixing device 12. The apparatus is able to function even if the ratio of gas to liquid is arbitrary. Thus, it is possible that e.g., lake water to be aerated is taken from the lake surface through a pipe so that half of the cross-sectional area of the inlet pipe is below the surface and the other half on the surface. In other words, the apparatus operates without any inlet pressure, in atmospheric conditions. The mixing device 12 is a pressure-raising mixer which attempts to pump the liquid entered through pipe 10 to the pressure pipe 16. Since it is a characteristic feature of the invention, e.g., that also a large volume of gas enters the mixing device via inlet pipe 10, that the pumping capacity of the mixing device is preferably dimensioned for a larger flow of liquid than possibly can enter the device, and that the pressure pipe or at least the flow thereinto is preferably adjusted in accordance with the liquid flow entering the mixing device, the following things will happen. Because a relatively small liquid flow enters the mixing device in view of the capacity thereof, the mixing device 12 is capable of generating such a pressure that a small amount of liquid passes to the pressure pipe. In this case, however, part of the liquid remains circulating inside the pump at the same time as the rotor of the mixing device also pumps gas, which has entered the mixing device, to a housing of the device. Thus, there is both gas and liquid in the same pressurized space in the mixing device, whereby gas is dissolved in liquid to such an extent which is possible in the prevailing circumstances.

A suitable delay is arranged in the mixing device in the manner described above, in order to give gas time to dissolve in the liquid. Factors having effect on the delay are naturally the capacity of the mixing device with respect to the incoming liquid flow, the dimension of the pressure pipe of the mixing device, and potential control with a valve, etc.

Another application of the invention is an arrangement in which gas is not actually dissolved in liquid, but it is mixed with the liquid as small bubbles. In this case, the pump housing need not be arranged with a higher pressure required by dissolving, but correspondingly a higher volume flow. An arrangement of this kind is especially suitable e.g., for treating wastepaper pulp, in which treatment ink and other particles removable with flotation are removed that way. The invention can naturally be applied to other uses of flotation as well.

Since the ratio of the liquid introduced into the mixing device to the gas introduced is practically arbitrary, the mixing device is provided with gas separating means, for removing surplus gas accumulated in front of the rotor. If too much gas accumulates in the mixing device, it will become filled with gas and can no longer manage to raise the pressure and consequently to dissolve gas. The mixing device may, for example, be arranged to treat the liquid flow entering the flotation plant or the dispersion water circulation of the flotation plant.

A preferred embodiment of the invention worth while mentioning is a centrifugal pump, which is capable of separating gas and is applicable to be used as a mixing device. In other words, it is a pump having means, in connection with the impeller, for removing gas from the pump. Said means may include, e.g., holes or openings arranged in the pump impeller, through which holes or openings gas is led to the rear side of the impeller, and a vacuum means, most usually a liquid ring pump, which is either mounted on the same shaft as the impeller or provided with a separate drive and disposed outside of the pump. A pump suitable for this purpose is disclosed, e.g., in European patent publication 0 478 228.

A still further preferred application of the present invention is to add various chemicals needed in the process, such as flocculation chemicals and dispersing agents to the inlet flow of the liquid entering the equipment according to the invention.

As is appreciated from the foregoing description, an apparatus which is much simpler and easier to operate than prior art has been developed for mixing gas with liquid. It is also worth while mentioning that it is a characteristic feature of a preferred embodiment of the invention that the pressure pipe of the equipment may be connected with, e.g., the flotation tank, whereby the same means is simultaneously used for mixing air with liquid, mixing various flotation chemicals with liquid, separating surplus gas, and pumping the liquid to the flotation tank. It is understood that the invention is by no means intended to be limited to what has been described above as preferred embodiments thereof, but the actual scope of the invention is defined by the accompanying claims, alone.

What is claimed is:

1. A method of mixing gas with a liquid using a mixing device, comprising:

(a) separately introducing the gas and liquid into the mixing device by allowing both the gas and the liquid to flow freely and in an arbitrary ratio into the mixing device, at a first pressure;

(b) allowing the gas either to dissolve in the liquid, or be mixed as small bubbles with the liquid;

(c) separating surplus gas from the mixing device; and (d) discharging the liquid and the gas dissolved therein, and the gas mixed therein as small bubbles, from the mixing device at a second pressure higher than the first pressure.

2. A method as recited in claim 1 wherein (a) is practiced without controlling or adjusting the separate flows of liquid and gas into the mixing device, and wherein (c) is practiced in order to ensure a substantially constant flow of liquid into the mixing device; and further comprising (e) discharging the surplus gas from the mixing device.

3. A method as recited in claim 2 wherein (b) is practiced in part by utilizing the mixing device to develop a pressure for enhancing the dissolution of gas in the liquid.

4. A method as recited in claim 2 wherein (d) is practiced by discharging the liquid, with dissolved gas, and small bubbles of mixed gas, therein into a flotation tank.

5. A method as recited in claim 1 further comprising, prior to the liquid entering the mixing device, (e) adding chemicals to the liquid, which chemicals are then mixed with the liquid in the mixing device.

6. A method as recited in claim 1 wherein (a) is practiced so that the first pressure is substantially atmospheric pressure.

7. A method as recited in claim 2 wherein (e) is practiced by use of vacuum.

8. A method as recited in claim 2 further comprising, prior to the liquid entering the mixing device, adding chemicals to the liquid, which chemicals are then mixed with the liquid in the mixing device.

9. A method as recited in claim 2 wherein (a) is practiced so that the first pressure is substantially atmospheric pressure, and using a common inlet for the gas and liquid.

10. A method as recited in claim 1 wherein (a) is practiced using effluent water as the liquid and air as the gas.

11. A method as recited in claim 5 wherein (a) is practiced using effluent water as the liquid and air as the gas; and wherein (e) is practiced utilizing flotation-enhancing chemicals.

12. A method as recited in claim 2 wherein (a) is practiced utilizing waste paper pulp suspension as the liquid and air as the gas.

13. A method as recited in claim 3 wherein (a)–(d) are practiced utilizing a centrifugal pump as the mixing device.

14. A method as recited in claim 13 further comprising, prior to the liquid entering the mixing device, (e) adding chemicals to the liquid, which chemicals are then mixed with the liquid in the mixing device; and wherein (a) is practiced utilizing waste paper pulp suspension as the liquid and air as the gas.

15. Apparatus for mixing gas with a liquid, comprising:

a centrifugal pump having an outlet conduit for a gas-liquid mixture, and an impeller for raising the liquid pressure of the gas-liquid mixture therein and for discharging the gas-liquid mixture therefrom;

a substantially atmospheric pressure common inlet conduit for separately introducing the liquid and the gas, which allows both the liquid and the gas to flow freely and in an arbitrary ratio into said pump;

a device which separates surplus gas from the gas-liquid mixture; and a conduit for discharging from said pump surplus gas separated from the gas-liquid mixture.

16. Apparatus as recited in claim 15 wherein the device which separates the surplus gas from the pump comprises openings in the impeller for leading the surplus gas to a rear portion of said impeller.

17. Apparatus as recited in claim 16 wherein said device which separates surplus gas further comprises a vacuum source for withdrawing surplus gas from said rear side of said impeller.

18. Apparatus as recited in claim 17 wherein said vacuum device comprises a liquid ring pump.

19. Apparatus as recited in claim 15 further comprising a flotation plant connected to said outlet conduit for the gas-liquid mixture from said pump.

20. Apparatus as recited in claim 15 further comprising a flotation plant supplied with dispersion water; and wherein said pump mixes air with dispersion water, and wherein said outlet conduit for the gas-liquid mixture from said pump is connected to said flotation plant.

* * * * *